Nov. 17, 1931.  G. M. NELL  1,832,470
LOCK CHUCK FOR STOPERS
Filed March 21, 1930    2 Sheets-Sheet 2
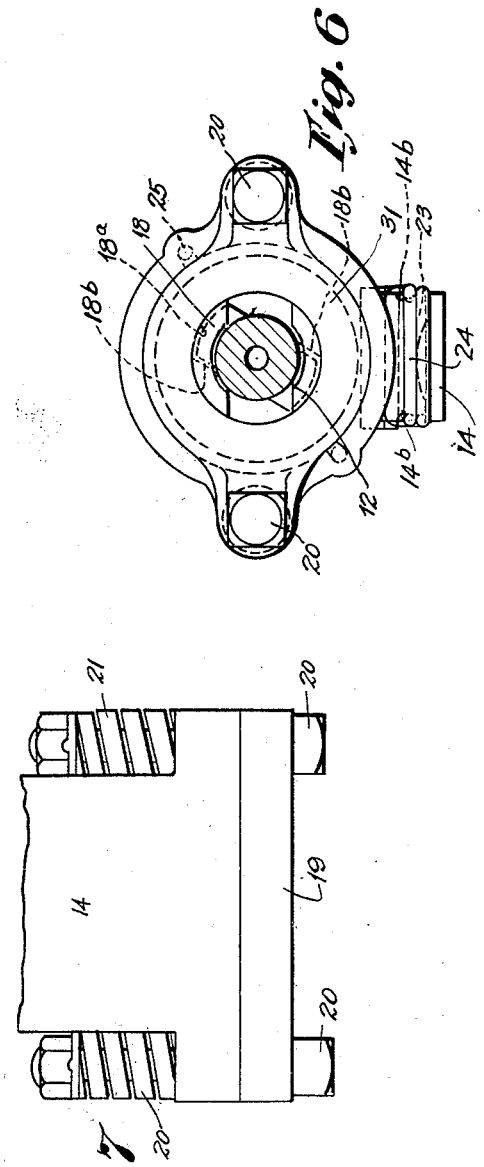
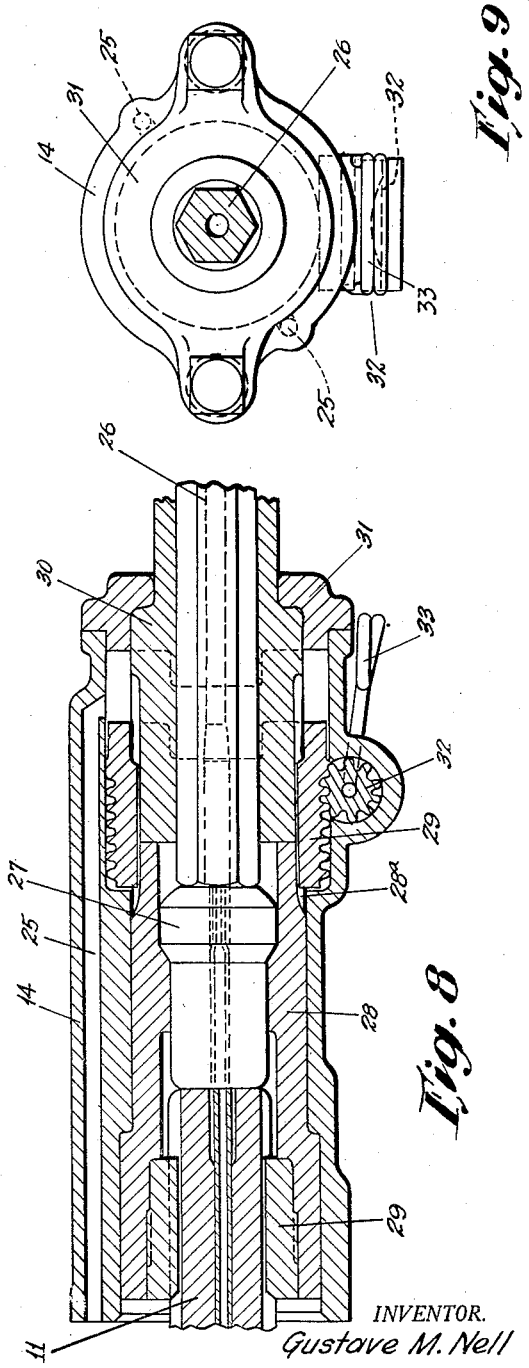
INVENTOR.
Gustave M. Nell
BY
Ira L. Nickerson
ATTORNEY.

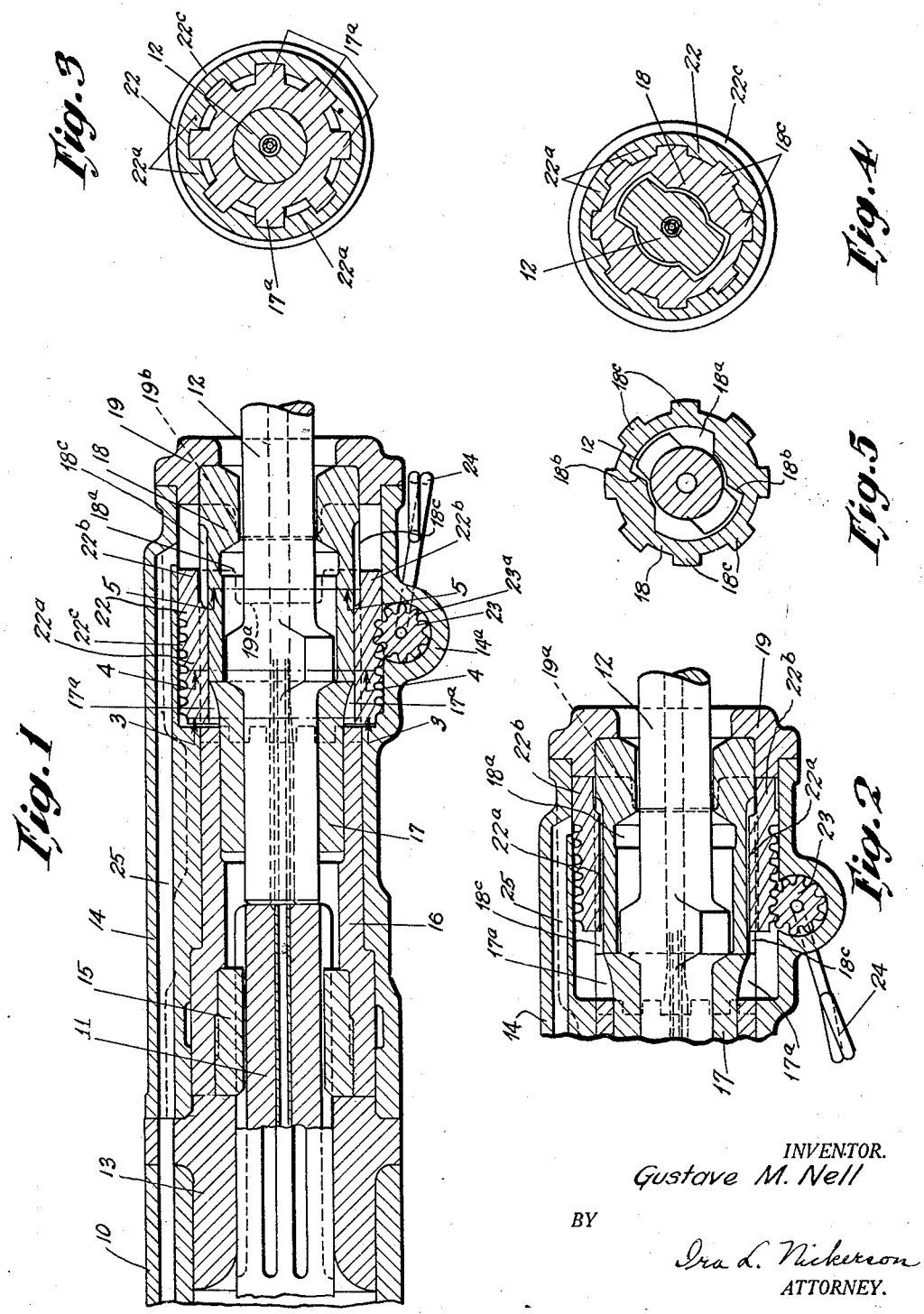

Patented Nov. 17, 1931

1,832,470

UNITED STATES PATENT OFFICE

GUSTAVE M. NELL, OF DETROIT, MICHIGAN, ASSIGNOR TO CHICAGO PNEUMATIC TOOL COMPANY, OF NEW YORK, N. Y., A CORPORATION OF NEW JERSEY

LOCK CHUCK FOR STOPERS

Application filed March 21, 1930. Serial No. 437,686.

This invention relates to fluid pressure drilling machines of the type commonly referred to as "self-rotating stopers" which have automatically operated rotation mechanism for stepping the drill steel around while it receives the blows of the percussive motor and a pneumatic feed leg or other power means for advancing the percussive motor to the work. More particularly the invention concerns the front head construction of such tools with special reference to the chuck for supporting the drill steel. It may be considered as a variation or modified form of the invention disclosed in my copending application Serial No. 437,687 filed of even date herewith.

One object of the invention is to prevent or to minimize "crawling" of the machine during the operation of hole starting. Another object is to adapt a self-rotated stoper for use as a hand-rotated stoper. Another object is to put the rotative train to the drill steel under convenient control of the operator. Still further objects will be apparent from the detailed description which follows.

In order to illustrate the invention concrete embodiments thereof are shown in the accompanying drawings, in which:

Fig. 1 is a longitudinal sectional view of a fragmentary portion of the front end of a self-rotated stoper showing the chuck parts in normal drill steel rotating position;

Fig. 2 is a sectional view similar to Fig. 1 but showing only the extreme end of the front head, the chuck being disengaged from the rotation mechanism and locked to the front head;

Fig. 3 is a transverse sectional view of a detail of the construction shown in Fig. 1, the section being taken substantially on the line 3—3 of Fig. 1;

Fig. 4 is a detail view similar to Fig. 3 taken on the line 4—4 of Fig. 1;

Fig. 5 is still another detail transverse sectional view substantially on the line 5—5 of Fig. 1;

Fig. 6 is a front end elevational view of the parts shown in Fig. 1;

Fig. 7 is fragmentary top plan view of the parts shown in Fig. 6;

Fig. 8 is a longitudinal sectional view similar to Fig. 1 but showing a modified form of chuck; and Fig. 9 is a front end elevational view of the parts shown in Fig. 8.

The invention relates to self-rotated stoping machines having a percussive motor, rotation mechanism for the drill steel, and a power feed such as a pneumatic feed leg for advancing the machine to the work. The power feed may be of any desired type and hence is not illustrated at all. The percussive motor and the rotation mechanism may be of any suitable or known type, and only such portions of them are illustrated as are necessary for an understanding of the invention.

In the form of the invention shown in Fig. 1–7 inclusive, the machine has a cylinder 10 in which reciprocates a hammer piston 11 for imparting blows directly to a drill steel 12, which as illustrated is of the lugged type. The splined end of piston 11 projects through cylinder bushing 13 into front head 14 where it cooperates with a splined nut 15 secured, as by a threaded engagement, to rotary sleeve 16. The latter has a bushing 17 telescoping into its outer end with a press fit. The bushing 17 projects beyond sleeve 16 and is provided externally with an annular series of axial splines 17a which extend rearwardly and form teeth interfitting with complementary teeth on the outer end of sleeve 16, as clearly indicated in Figs. 1 and 2. The purpose of these interfitting teeth is merely to insure rotation of bushing 17 with sleeve 16. Bushing 17 serves as a guide for the shank end of drill steel 12 inwardly of the lugs, as clearly indicated in Figs. 1, 2 and 3.

In axial alignment with rotative sleeve 16 and its bushing 17 and in abutting contact with the latter is chuck 18 for drill steel 12. Since this chuck is adapted for lugged steel it has a transverse slot opening, as shown in Fig. 6, which is enlarged inwardly at 18a to provide the customary bayonet lock and abutment surfaces 18b (Figs. 5 and 6) for automatically rotating the steel when the rotation mechanism is in operation. The inner end of the lugged recess is again narrowed as indicated in Fig. 4 to substantially the form of the outer opening so as to provide for rotary movement of the steel in both directions when the machine is used as a hand-rotated stoper.

The outer end of chuck 18 is journalled in thrust collar 19 resiliently secured to the outer end of front head 14 by bolts 20 having buffer springs 21 thereon. The inner end of chuck 18 has a bearing in an annular coupling member or sleeve 22 slidably mounted for limited axial movement in front head 14. On its inner face member 22 has axial splines or ribs 22a which are continuously in keyed sliding engagement with cooperating splines or ribs 18c on the exterior surface of chuck 18 with the result that member 22 and chuck 18 rotate or remain stationary together but member 22 is movable axially of the front head relative to chuck 18 which is held in fixed axial position by having its opposite ends in engagement with sleeve bushing 17 on the one hand and abutment collar 19 on the other.

When member 22 is at the inmost limit of its axial movement (Fig. 1) it telescopes over the projecting splined portion of sleeve bushing 17 and its splines 22a slidably mesh with splines 17a. In this position member 22 couples bushing 18 to rotative sleeve 16. The opposite end of member 22 is formed with large clutch teeth 22b for engagement with similar cooperative teeth 19a on abutment collar 19. Consequently when member 22 is moved to its outer position (Fig. 2) it breaks the driving connection between rotative sleeve 17 and chuck 18 and clutches the latter to front head 14 through engagement with teeth 22b with teeth 19a on collar 19.

Provision is made for convenient adjustment by the operator of coupling member 22 within front head 14. To this end a shift gear 23 is journalled in a transverse extension 14a of the front head and has gear teeth 23a meshing with annular teeth 22c on the exterior of member 22. The ends of shift gear 23 project beyond extension 14a in which it is journalled as clearly indicated in Fig. 6 and these ends are engaged by the parallel arms of a spring clip 24 which serves not only as a retainer for gear 23 but also as a handle for operating gear 23. By preference notches 14b are provided in extension 14 into which the resilient arms of clip 24 snap to retain the latter in adjusted position.

In using the machine the operator can temporarily convert the same from a self-rotating stoper into a hand-rotated machine for hole starting by shutting off the motive fluid to his percussive motor and then swinging spring clip handle 24 rearwardly from the position shown in Fig. 1 to that shown in Fig. 2. The consequent movement of coupling member 22 disengages chuck 18 from rotative sleeve 16 and clutches it to front head 14 through collar 19 thereby locking the chuck against relative rotative movement. The operator can then oscillate the machine as a whole by the usual handle (not shown) and transmit such oscillating movement directly to the drill steel by the close fit of the lugs in the chuck socket, as indicated in Fig. 4. After using the machine as a hand-rotated stoper to "collar" the hole he shuts off the throttle valve and moves clip handle 24 to forward position (Fig. 1) to restore the driving connection between sleeve 16 and chuck 18 and then has a self-rotating stoper to continue the work. A passage 25 extending through front head 14 may be utilized to conduct motive fluid and lubricant to the moving parts of the chuck, the oil to lubricate the same and the motive fluid to keep out dirt and cuttings.

The modification shown in Figs. 8 and 9 provides for the use of shankless drill steel but the principal features and the manner of operation of the previously described form are retained. To prevent the shankless drill steel 26 from extending two far within the machine an anvil block 27 is mounted in rotative sleeve 28 which has a splined nut 29 for cooperation with the end of piston 11. There is no bushing for the front end of sleeve 28 but axial splines 28a are formed directly in the sleeve to be telescopingly engaged by the internal splines on coupling member 29 which is similar in all respects to coupling member 22 of the previous form. Chuck 30 has a polygonal opening to receive the polygonal shank of steel 26 and is supported against axial movement between sleeve 28 and resiliently supported thrust collar 31. Chuck 30 has a bearing in thrust collar 31 and in slidable coupling member 29 which is operated as in the previous form by a shift gear 32 controlled by clip handle 33.

While the invention has been herein described in what are now considered to be preferred forms, it is to be understood that the invention is not limited to the specific details thereof but covers all changes, modifications, and adaptations within the scope of the appended claims.

I claim as my invention:

1. A drilling machine having a cylinder, a hammer piston reciprocable in said cylinder, a chuck for supporting a drill steel in position to receive the blows of said piston, rotation mechanism for said chuck including a rotative sleeve, means maintaining said chuck and sleeve in fixed axial relation to each other, and coupling means movable relative to said sleeve and said chuck for making and breaking the driving connection therebetween.

2. A drilling machine having a cylinder, a hammer piston reciprocable in said cylinder, a chuck for supporting a drill steel in position to receive the blows of said piston, rotation mechanism for said chuck including a rotative sleeve, means maintaining said chuck and sleeve in fixed axial relation to each other, coupling means movable relative to said sleeve and said chuck for making and breaking the driving connection therebetween, and manual means for controlling said coupling means.

3. A drilling machine having a cylinder, a hammer piston reciprocable therein, a chuck for supporting a drill steel in position to receive the blows of said piston, rotation mechanism for said chuck including a rotative sleeve, said sleeve and said chuck being mounted in fixed axial relation within said front head, and coupling means on said front head for making and breaking the driving connection between said sleeve and said chuck.

4. A drilling machine having a cylinder, a hammer piston reciprocable therein, a chuck for supporting a drill steel in position to receive the blows of said piston, rotation mechanism for said chuck including a rotative sleeve, said sleeve and said chuck being mounted in fixed axial relation within said front head, and coupling means on said front head for locking said chuck to said sleeve to rotate with the latter or to said front head.

5. A drilling machine having a cylinder, a hammer piston reciprocable therein, a chuck for supporting a drill steel in position to receive the blows of said piston, rotation mechanism for said chuck including a rotative sleeve, said sleeve and said chuck being mounted in fixed axial relation within said front head, and a coupling member in said front head movable relative to said chuck for locking the same to said sleeve or to said front head.

6. A drilling machine having a cylinder, a hammer piston reciprocable therein, a chuck for supporting a drill steel in position to receive the blows of said piston, rotation mechanism for said chuck including a rotative sleeve, said sleeve and said chuck being mounted in fixed axial relation within said front head, and means including a coupling sleeve in said front head slidable on said chuck for coupling the latter to said sleeve or to said front head.

7. A drilling machine having a cylinder, a hammer piston reciprocable therein, a chuck for supporting a drill steel in position to receive the blows of said piston, rotation mechanism for said chuck including a rotative sleeve, said sleeve and said chuck being mounted in fixed axial relation within said front head, and means including a coupling sleeve in said front head slidable on said chuck for coupling the latter to said sleeve or to said front head, and a shift gear for operating said coupling sleeve.

8. A drilling machine having a cylinder, a hammer piston reciprocable therein, a chuck for supporting a drill steel in position to receive the blows of said piston, rotation mechanism for said chuck including a rotative sleeve, said sleeve and said chuck being mounted in fixed axial relation within said front head, a member sleeved over said chuck and keyed thereto for sliding movement thereon, and cooperating means on the opposite ends of said member and on the respective adjacent portions of said rotative sleeve and said front head for establishing a selective coupling connection.

9. A drilling machine having a cylinder, a hammer piston reciprocable therein, a chuck for supporting a drill steel in position to receive the blows of said piston, rotation mechanism for said chuck including a rotative sleeve, said sleeve and said chuck being mounted in fixed axial relation within said front head, a member sleeved over said chuck and having an axially splined connection therewith, means for moving said member on said chuck, and means dependent upon the position of said member for establishing a coupling connection of said chuck with said sleeve and with said front head.

10. A drilling machine having a cylinder, a hammer piston reciprocable therein, a chuck for supporting a drill steel in position to receive the blows of said piston, rotation mechanism for said chuck including a rotative sleeve, said sleeve and said chuck being mounted in fixed axial relation within said front head, a member sleeved on said chuck and having an axially splined connection therewith, means for establishing a telescoping coupling connection between said member and said sleeve and a coupling connection between said member and said front head by movement of said member, and manual means on said front head for moving said member.

11. A drilling machine having a cylinder, a hammer piston reciprocable therein, a chuck for supporting a drill steel in position to receive the blows of said piston, rotation mechanism for said chuck including a rotative sleeve, said sleeve and said chuck being mounted in fixed axial relation within said front head, a member sleeved on said chuck and having an axially splined connection therewith, means for establishing a telescoping coupling connection between said member and said sleeve and a coupling connection between said member and said front head by movement of said member, a shift gear journalled in said front head for moving said member, and a control handle for said gear.

Signed by me at Detroit, in the county of Wayne and State of Michigan, this 18th day of March, 1930.

GUSTAVE M. NELL.